United States Patent
Iida et al.

(10) Patent No.: US 11,881,686 B2
(45) Date of Patent: Jan. 23, 2024

(54) RESIN STRUCTURE

(71) Applicant: Yazaki Corporation, Tokyo (JP)

(72) Inventors: Hiroaki Iida, Makinohara (JP); Kei Tomita, Makinohara (JP); Mamiko Kondo, Makinohara (JP); Kengo Ishida, Makinohara (JP); Koji Makiyama, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 284 days.

(21) Appl. No.: 17/494,476

(22) Filed: Oct. 5, 2021

(65) Prior Publication Data

US 2022/0115846 A1   Apr. 14, 2022

(30) Foreign Application Priority Data

Oct. 12, 2020  (JP) .................. 2020-172006

(51) Int. Cl.
  *H02B 1/46*   (2006.01)
(52) U.S. Cl.
  CPC ...................... *H02B 1/46* (2013.01)
(58) Field of Classification Search
  CPC .............................. H02B 1/46; B60R 16/0238
  USPC ......................... 220/3.8, 3.94, 4.02
  See application file for complete search history.

(56) References Cited

U.S. PATENT DOCUMENTS

| 5,295,602 | A | * | 3/1994 | Swanson | ............ F02M 35/0203 55/502 |
|---|---|---|---|---|---|
| 5,427,261 | A | * | 6/1995 | Naitou | .................. H02G 3/14 220/3.94 |
| 5,577,779 | A | * | 11/1996 | Dangel | .................. E05C 19/06 220/326 |
| 5,731,544 | A | * | 3/1998 | Burck | .................. H02G 3/14 220/241 |
| 7,413,479 | B1 | * | 8/2008 | Volpone | ............... H01R 13/506 439/352 |
| 7,553,180 | B2 | * | 6/2009 | Hu | ...................... H05K 5/0221 439/352 |
| 7,641,071 | B2 | * | 1/2010 | Wu | ........................ G03F 1/66 220/326 |

(Continued)

FOREIGN PATENT DOCUMENTS

| CN | 103036120 | A | * | 4/2013 | ......... B60R 16/0238 |
|---|---|---|---|---|---|
| CN | 113363908 | A | * | 9/2021 | ......... B60R 16/0238 |

(Continued)

*Primary Examiner* — J. Gregory Pickett
*Assistant Examiner* — Niki M Eloshway
(74) *Attorney, Agent, or Firm* — Sughrue Mion, PLLC

(57) ABSTRACT

There is provided a resin structure including: a first resin body; a second resin body; and a third resin body. A recessed groove of the first resin body is configured to guide an inspection tool, which is used for inspecting an engagement state between a first engagement portion and a second engagement portion, toward the first engagement portion along the recessed groove in a state where the second resin body is assembled to the first resin body and the third resin body is not assembled to the first resin body. A groove bottom surface of the recessed groove and the second engagement portion engaged with the first engagement portion are spaced apart from each other in a thickness direction by a protruding portion protruding in the thickness direction of a wall portion of the first resin body.

4 Claims, 7 Drawing Sheets

(56) References Cited

U.S. PATENT DOCUMENTS

| | | | |
|---|---|---|---|
| 8,245,868 B2* | 8/2012 | Ikeda | F02M 35/024 |
| | | | 220/326 |
| 2009/0260996 A1* | 10/2009 | Ikeda | F02M 35/024 |
| | | | 206/1.5 |
| 2013/0032371 A1* | 2/2013 | Makino | H05K 7/026 |
| | | | 174/50 |
| 2020/0295549 A1* | 9/2020 | Kurata | B60R 16/0238 |
| 2022/0115851 A1* | 4/2022 | Tomita | H02G 3/081 |

FOREIGN PATENT DOCUMENTS

| | | | | |
|---|---|---|---|---|
| DE | 102012212966 A1 * | 2/2013 | | B60R 16/0238 |
| JP | 2013-34320 A | 2/2013 | | |
| JP | 6701260 B2 * | 5/2020 | | B60R 16/0207 |

* cited by examiner

RESIN STRUCTURE

CROSS-REFERENCE TO RELATED APPLICATIONS

This application is based on and claims priority under 35 USC 119 from Japanese Patent Application No. 2020-172006 filed on Oct. 12, 2020, the contents of which are incorporated herein by reference.

TECHNICAL FIELD

The present disclosure relates to a resin structure including a plurality of resin bodies assembled to each other.

BACKGROUND ART

Conventionally, a resin structure configured by assembling a plurality of resin bodies to each other, such as an electrical junction box (for example, a relay box) mounted on a vehicle, has been proposed. For example, one of electrical junction boxes according to the related art includes a body case made of resin that holds electronic components, an upper cover made of resin that is assembled to an upper portion of the body case, and a lower cover made of resin that is assembled to a lower portion of the body case. In this electrical junction box, the upper cover and the lower cover are fixed to the body case by inserting lock pieces extending from each of the upper cover and the lower cover toward the body case into locking holes of a body portion and locking the lock pieces thereto (see, for example, JP2013-034320A).

When a plurality of resin bodies are assembled to each other as in the resin structure according to the related art described above, whether the lock piece and the locking hole are appropriately engaged with each other may be inspected using an inspection tool (a so-called inspection jig) different from the resin structure. An example of this type of inspection tool is an inspection pin including a rod-shaped body portion and a contact sensor provided at a distal end of the body portion. Typically, when the inspection pin is brought close to an assumed position of the lock piece when the lock piece and the locking hole are properly engaged with each other, the inspection pin inspects the engagement state by whether the contact sensor outputs a contact signal with the lock piece at the assumed position.

However, when such an inspection pin is actually used, it may be difficult to bring the contact sensor into contact with the lock piece as designed in a case where the lock piece is small and thin, a case where the lock piece is slightly exposed to the outside after engagement. In this case, it is not possible to accurately inspect the engagement state, and an erroneous detection, such as an inspection result being incomplete engagement even though the lock piece and the locking hole are actually in a proper engaged state, may occur. From the viewpoint of improving the productivity of the resin structure, it is desirable that the resin structure itself is configured so that the above-described inspection can be performed with high accuracy.

SUMMARY OF INVENTION

The present disclosure provides a resin structure having a structure by which an assembled state of a plurality of resin bodies can be inspected with high accuracy.

According to an illustrative aspect of the present disclosure, a resin structure includes: a first resin body; a second resin body configured to be assembled to the first resin body; and a third resin body configured to be assembled to the first resin body. The first resin body includes: a first engagement portion provided in a wall portion of the first resin body in a vicinity of a boundary between the first resin body and the second resin body; and a recessed groove provided in the wall portion to extend from the first engagement portion toward a boundary between the first resin body and the third resin body. The second resin body includes a second engagement portion that engages with the first engagement portion. The recessed groove is configured to guide an inspection tool toward the first engagement portion along the recessed groove in a state where the second resin body is assembled to the first resin body and the third resin body is not assembled to the first resin body, the inspection tool being a tool for inspecting an engagement state between the first engagement portion and the second engagement portion. The wall portion includes a protruding portion protruding in a thickness direction of the wall portion toward the second engagement portion, at a position where the first engagement portion is provided. A groove bottom surface of the recessed groove and the second engagement portion engaged with the first engagement portion are spaced apart from each other in the thickness direction by the protruding portion.

The present disclosure has been briefly described above. Further, details of the present disclosure will be further clarified by reading a mode for carrying out the invention described below with reference to the accompanying drawings.

BRIEF DESCRIPTION OF DRAWINGS

FIGS. 3A and 3B are a perspective view illustrating a first engagement portion of the body case and a second engagement portion of the lower cover, in which FIG. 3A illustrates a state where the first engagement portion and the second engagement portion are separated from each other, and FIG. 3B illustrates a state where the first engagement portion and the second engagement portion are engaged with each other.

DESCRIPTION OF EMBODIMENTS

Embodiment

Hereinafter, a resin structure 1 according to an embodiment of the present disclosure illustrated in FIG. 1 will be described with reference to the drawings. The resin structure 1 is typically a relay box (electrical connection box) that is mounted on a vehicle and houses electronic components such as a relay.

Figure 1:
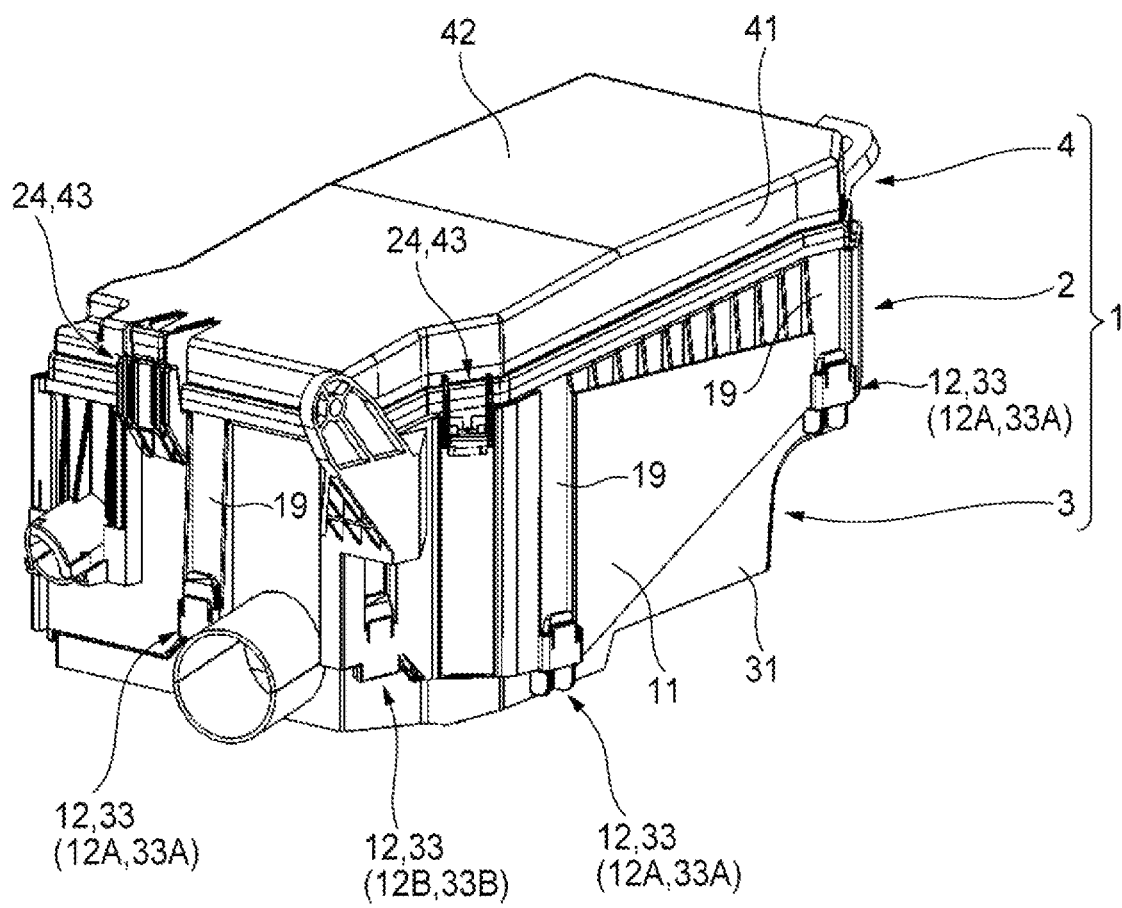
FIG. 1 is a perspective view of a resin structure according to an embodiment of the present disclosure.
Figure 1:
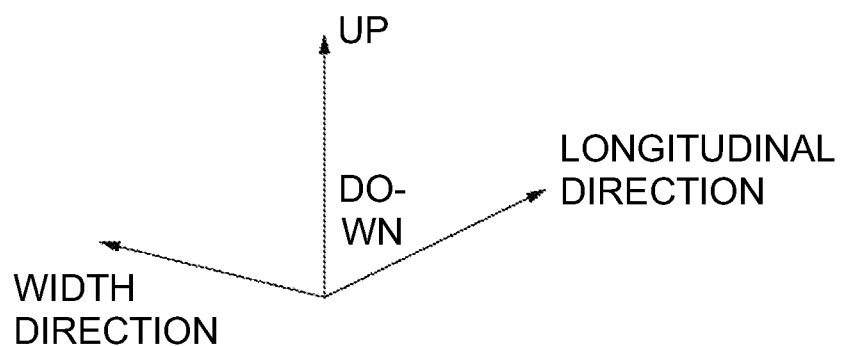
Figure 2:
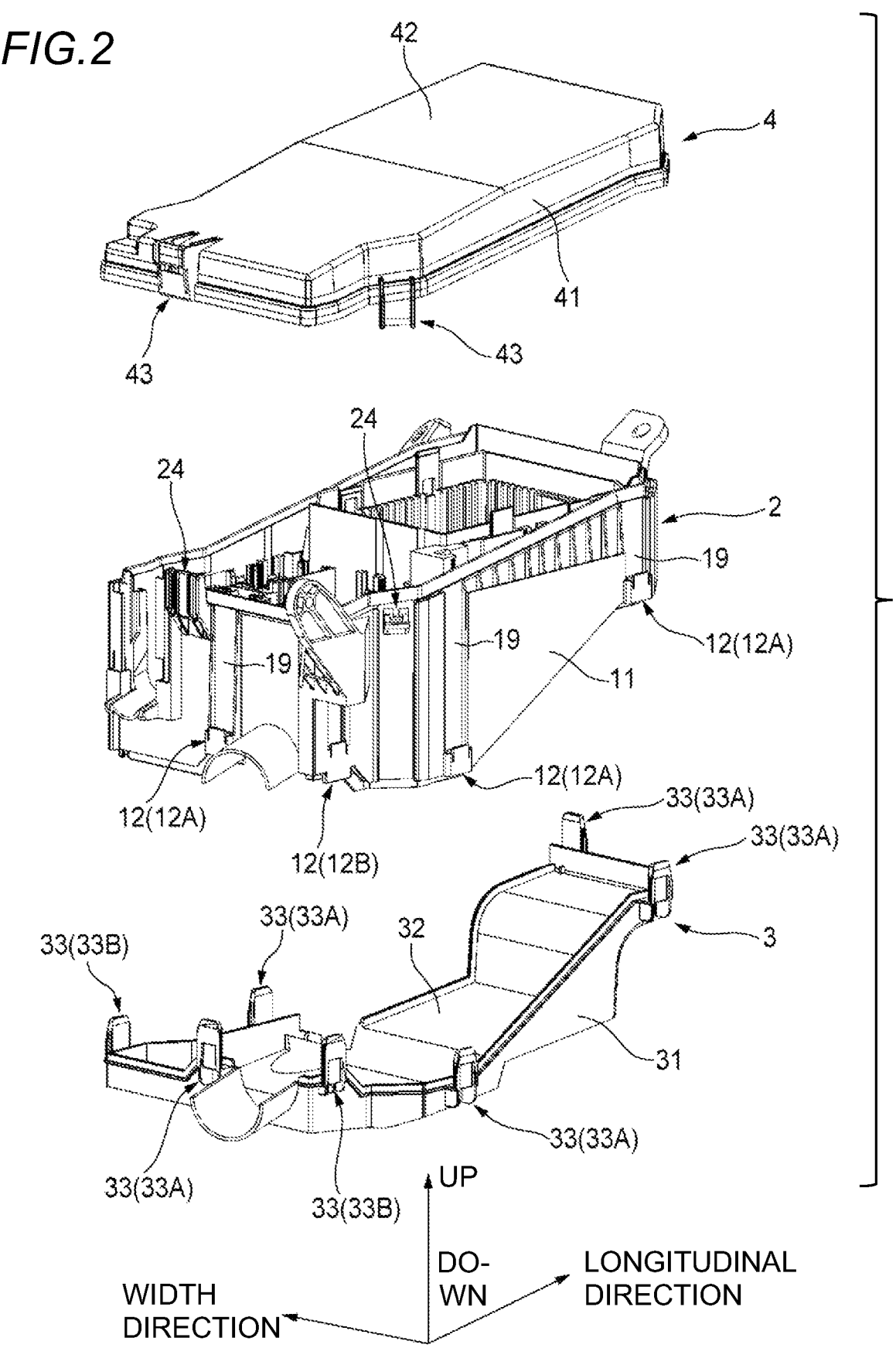
FIG. 2 is a perspective view of the resin structure illustrated in FIG. 1 in a state where an upper cover, a body case, and a lower cover are separated from one another.

As illustrated in FIGS. 1 and 2, the resin structure 1 includes a body case 2 in which electronic components (and other components, not illustrated) such as a relay are housed, a lower cover 3 assembled to a lower end portion of the body case 2 so as to close a lower end opening portion of the body case 2, and an upper cover 4 assembled to an upper end portion of the body case 2 so as to close an upper end opening portion of the body case 2. Each of the body case 2, the lower cover 3, and the upper cover 4 is a resin molded body. The body case 2 corresponds to a "first resin body" of the present disclosure, the lower cover 3 corresponds to a "second resin body" of the present disclosure, and the upper cover 4 corresponds to a "third resin body" of the present disclosure.

Hereinafter, for convenience of description, as illustrated in FIGS. 1 to 6, "up-down direction", "longitudinal direction", "width direction", "inner-outer direction", "up", "down", "inner", and "outer" are defined. The "up-down direction", the "longitudinal direction", and the "inner-outer direction" are orthogonal to one another. When the resin structure 1 is mounted on the vehicle, the "up-down direction" corresponds to the up-down direction of the vehicle. The "longitudinal direction" corresponds to a longitudinal direction of a peripheral wall 11 (described later) of the body case 2, a peripheral wall 31 (described later) of the lower cover 3, and a peripheral wall 41 (described later) of the upper cover 4 among a circumferential direction in these peripheral walls 11, 31, 41. The "width direction" corresponds to a short direction of these peripheral walls 11, 31, 41 among the circumferential direction. The "inner-outer direction" corresponds to a thickness direction of the peripheral wall 11, the peripheral wall 31, and the peripheral wall 41. Hereinafter, each member constituting the resin structure 1 will be described in order.

First, the body case 2 will be described. As illustrated in FIG. 2, the body case 2 includes a substantially rectangular cylindrical peripheral wall 11 extending in the up-down direction. On an outer surface in a vicinity of a substantially rectangular frame-shaped lower end edge portion of the peripheral wall 11, the first engagement portions 12 are respectively provided at a plurality of positions (seven positions in the present example) in the longitudinal direction and the width direction. In a state where the assembly of the body case 2 and the lower cover 3 is completed (see FIG. 1), a plurality of first engagement portions 12 are respectively engaged with a plurality of second engagement portions 33, which will be described later, provided on the lower cover 3 (also see FIG. 3B).

In the present example, two types of first engagement portions 12, i.e., a first engagement portion 12A (at five positions) and a first engagement portion 12B (at two positions), are provided as the first engagement portion 12 (see FIG. 2). Correspondingly, two types of second engagement portions 33, i.e., a second engagement portion 33A (at five positions) that is to be engaged with the first engagement portion 12A and a second engagement portion 33B (at two positions) that is to be engaged with the first engagement portion 12B, are provided as the second engagement portion 33 (see FIG. 2).

The first engagement portion 12A and the first engagement portion 12B are slightly different from each other in detailed shape, but have substantially the same structure. Similarly, the second engagement portion 33A and the second engagement portion 33B are slightly different from each other in detailed shape, but have substantially the same structure. FIGS. 3A to 3B and FIGS. 4 to 6 illustrate engagement positions of the first engagement portion 12A and the first engagement portion 12B.

Hereinafter, when it is not necessary to distinguish between the first engagement portion 12A and the first engagement portion 12B, each of the first engagement portion 12A and the first engagement portion 12B is simply referred to as a first engagement portion 12. Similarly, when it is not necessary to distinguish between the second engagement portion 33A and the second engagement portion 33B, each of the second engagement portion 33A and the second engagement portion 33B is simply referred to as a second engagement portion 33.

Figure 3A:
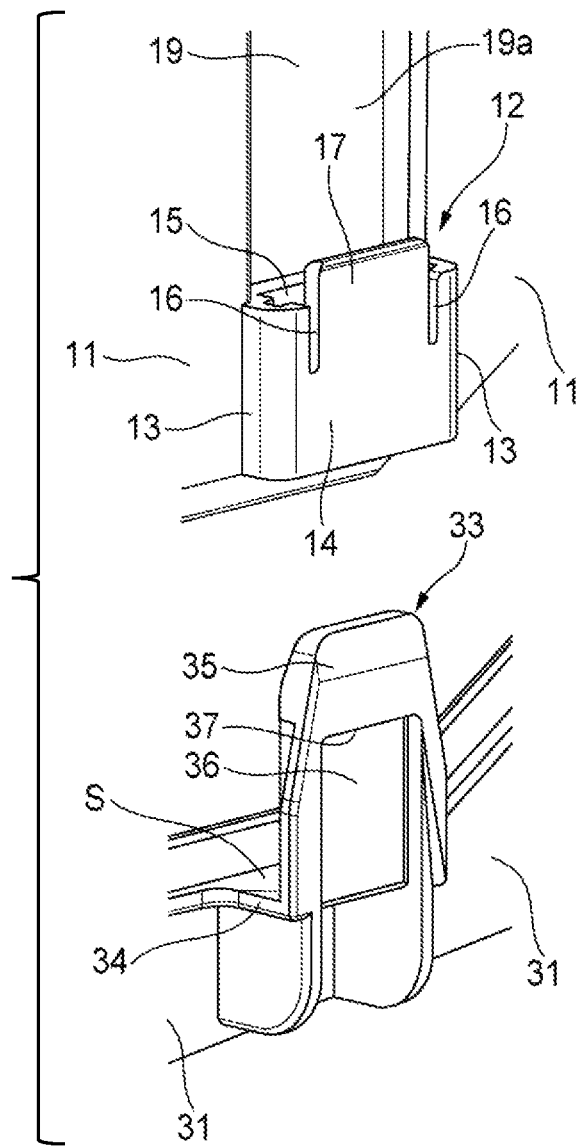
Figure 3B:
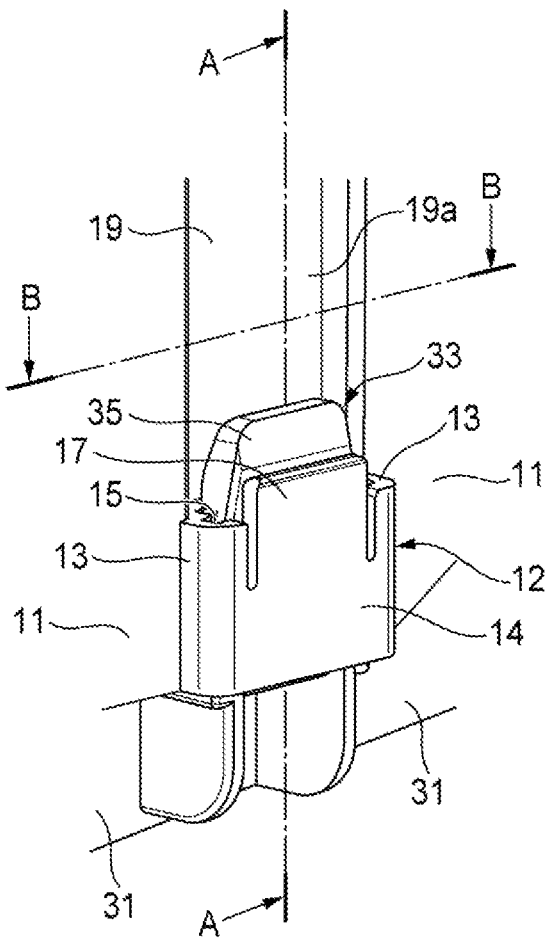
Figure 3B:
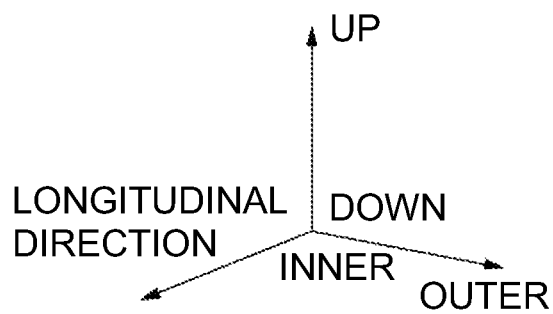
Figure 3B:
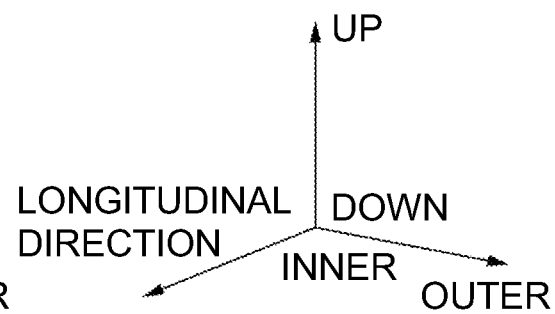

Specifically, as illustrated in FIG. 3A, each of the first engagement portions 12 includes a pair of rectangular flat plate-shaped side wall portions 13 that protrude outward from an outer surface in the vicinity of the lower end edge portion of the peripheral wall 11 at a predetermined distance in the longitudinal direction and extend in parallel in the up-down direction, and a substantially rectangular flat plate-shaped outer wall portion 14 that connects the outer end edges of the pair of side wall portions 13 in the longitudinal direction and extends in the longitudinal direction. As a result, in the first engagement portion 12, a locking hole 15 is defined by the peripheral wall 11, the pair of side wall portions 13, and the outer wall portion 14 (also see FIG. 4). The locking hole 15 penetrates in the up-down direction and has a substantially rectangular shape that is long in the longitudinal direction when viewed in the up-down direction.

Figure 4:
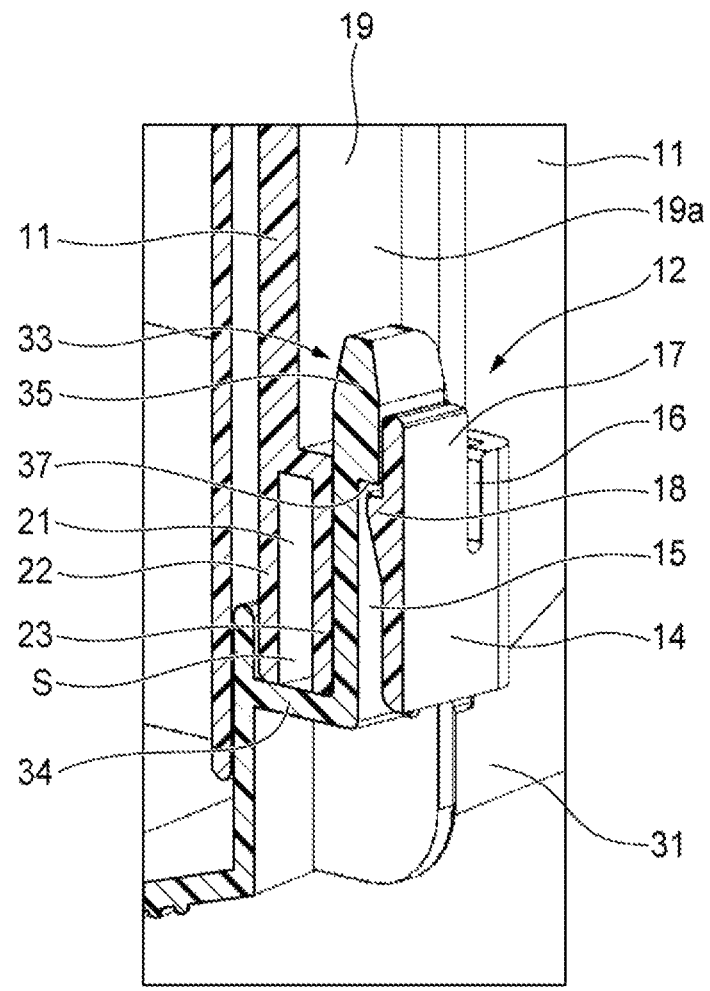
FIG. 4 is a perspective view illustrating a cross section taken along a line A-A of FIG. 3B.
Figure 4:
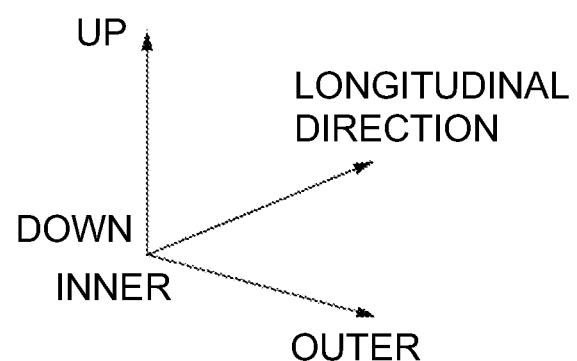
Figure 5:
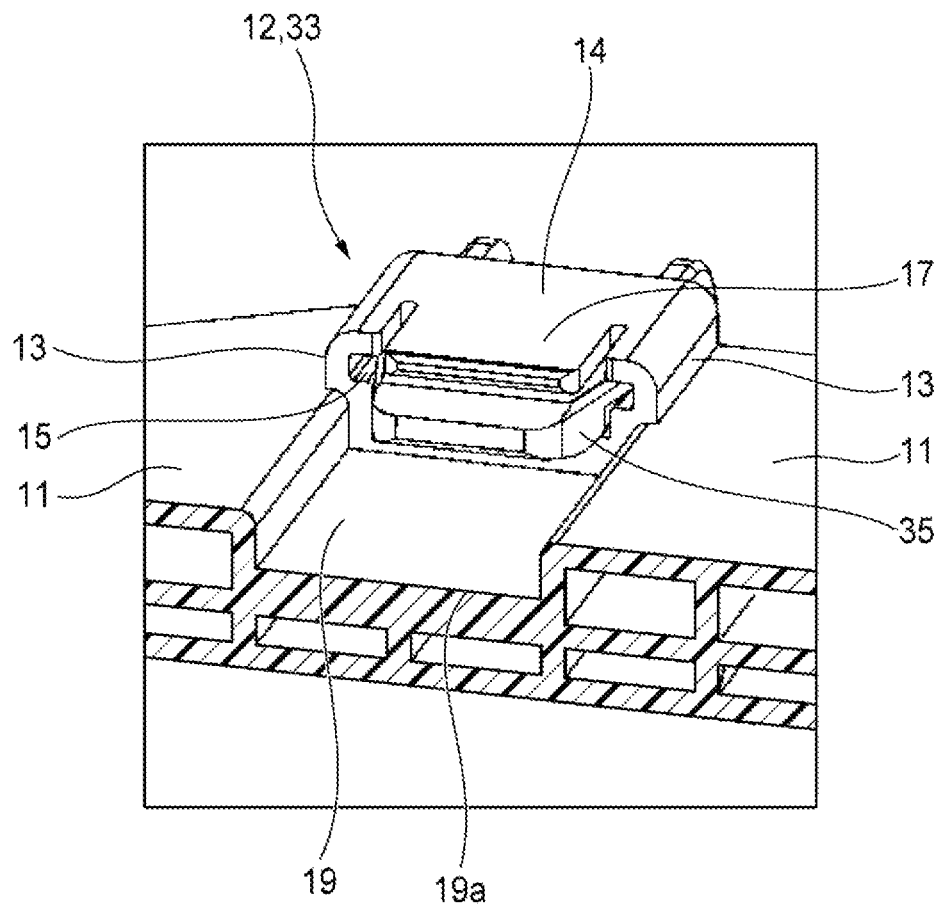
FIG. 5 is a perspective view illustrating a cross section taken along a line B-B of FIG. 3B.
Figure 5:
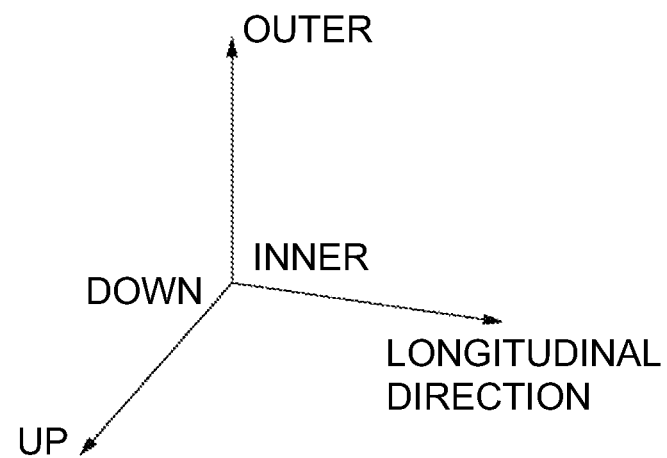

A pair of slits 16, which are spaced apart from each other by a predetermined distance in the longitudinal direction and extend in parallel in the up-down direction, are formed from an upper end edge of the outer wall portion 14 to a vicinity of a central portion in the up-down direction on the outer wall portion 14. As a result, a part of the outer wall portion 14, which is positioned between the pair of slits 16, includes a lock arm 17 extending upward in a cantilever shape. The lock arm 17 is elastically deformable over a predetermined range in the inner-outer direction. As illustrated in FIG. 4, a locking protrusion 18 protruding inward and extending in the longitudinal direction is formed on an inner surface (i.e., a surface defining an outer end of the locking hole 15) of the lock arm 17.

As illustrated in FIGS. 1 to 6, a recessed groove 19, which extends in the up-down direction from a position corresponding to an upper end portion of the first engagement portion 12A to a position corresponding to an upper end edge portion of the peripheral wall 11, is provided on an outer surface of the peripheral wall 11 at a longitudinal position corresponding to each first engagement portion 12A. The recessed groove 19 is provided to guide an inspection tool 50 (see FIG. 6), which will be described later, in the up-down direction while allowing the inspection tool 50 to pass through the inside of the recessed groove 19. On the other hand, a recessed groove extending in the up-down direction to a position corresponding to the upper end edge portion of the peripheral wall 11, such as the recessed groove 19, is not formed on an outer surface of the peripheral wall 11 at a longitudinal position corresponding to each first engagement portion 12B.

Figure 6:
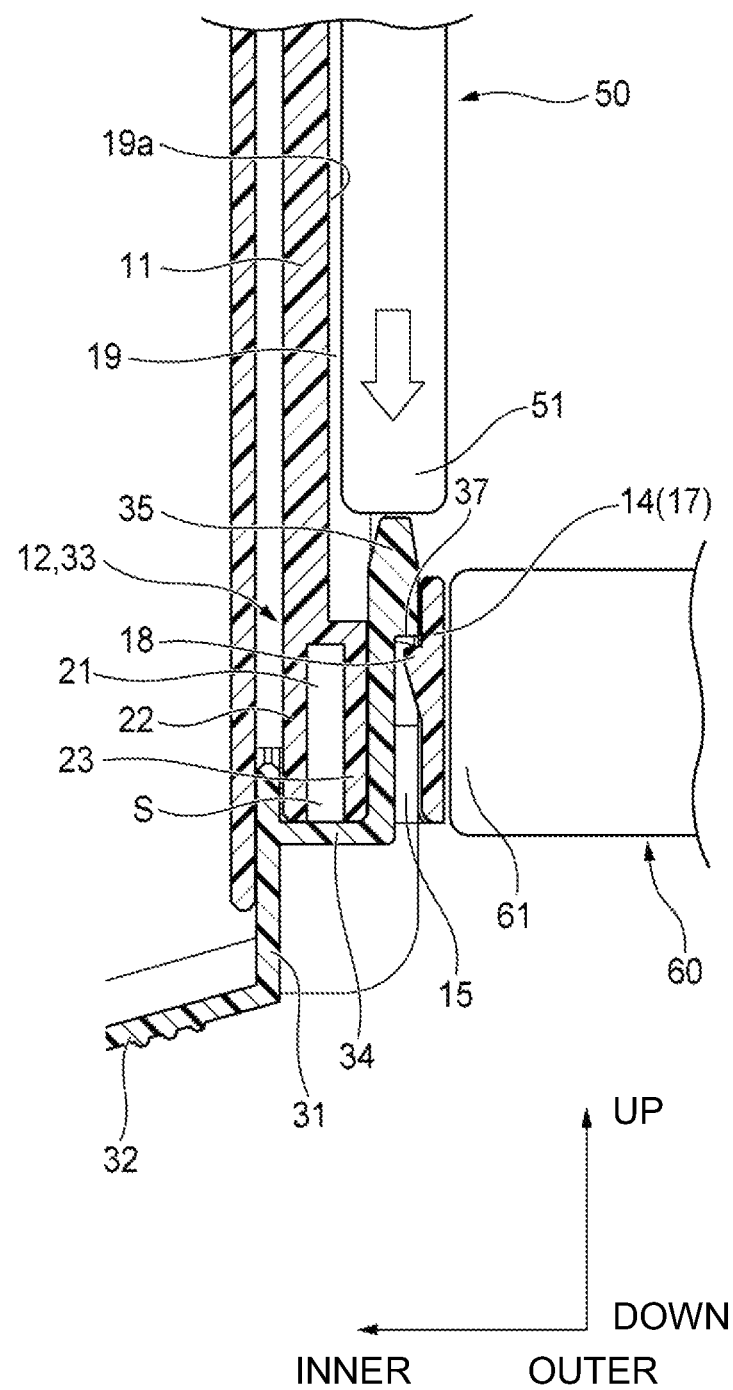
FIG. 6 is a view corresponding to the cross section taken along a line A-A of FIG. 3B for showing a method of inspecting an engagement state between the first engagement portion and the second engagement portion using an inspection tool.

As illustrated in FIGS. 4 and 6, a part of the peripheral wall 11 corresponding to each first engagement portion 12 (that is, a part defining an inner end of the locking hole 15) forms a double wall structure in which a cavity 21 opening downward is sandwiched between an inner wall 22 and an outer wall 23. The double wall structure is adjacent to a lower side of a lower end edge of the recessed groove 19. An outer surface of the outer wall 23 is positioned outside a groove bottom surface 19a of the recessed groove 19. That is, the outer wall 23 includes a protruding portion that protrudes toward the second engagement portion 33. Accordingly, since there is a design margin in the thickness direction of the peripheral wall 11 by the depth of the recessed groove 19, it is easy to provide a double wall structure in the peripheral wall 11. Further, since the second engagement portion 33 (particularly, an extending portion 35) is spaced apart from the groove bottom surface 19a of the recessed groove 19 in the thickness direction of the peripheral wall 11 by the outer wall 23 (that is, the protruding portion), the accuracy of the assembly inspection is improved as described later. Note that such a double wall structure may be provided only in the first engagement portion 12A, and may not be provided in the first engagement portion 12B.

As illustrated in FIG. 2, third engagement portions 24 are respectively provided at a plurality of positions in the longitudinal direction and the width direction on an outer surface in a vicinity of a substantially rectangular frame-shaped upper end edge portion of the peripheral wall 11. A detailed description of a structure of the third engagement portion 24 will be omitted. In a state where the assembly of the body case 2 and the upper cover 4 is completed (see FIG. 1), the plurality of third engagement portions 24 are respectively engaged with a plurality of fourth engagement portions 43, which will be described later, provided on the upper cover 4 (also see FIG. 1).

Next, the lower cover 3 will be described. As illustrated in FIG. 2, the lower cover 3 integrally includes a substantially rectangular cylindrical peripheral wall 31 extending in the up-down direction and a bottom wall portion 32 that closes a lower end opening portion of the peripheral wall 31.

On an outer surface in a vicinity of a substantially rectangular frame-shaped upper end edge portion of the peripheral wall 31, second engagement portions 33 are respectively provided at a plurality of positions (seven positions in this example) in the longitudinal direction and the width direction corresponding to the plurality of first engagement portions 12 of the body case 2.

Specifically, as illustrated in FIG. 3A, each of the second engagement portions 33 includes a substantially rectangular flat plate-shaped base end portion 34 that protrudes outward from an outer surface in the vicinity of an upper end edge portion of the peripheral wall 31 and extends in the longitudinal direction, and a substantially rectangular flat plate-shaped extending portion 35 that extends upward from an outer end edge portion of the base end portion 34. As a result, an inter-wall space S whose lower end is defined by the base end portion 34 and which opens upward is formed between the peripheral wall 31 and the extending portion 35 (also see FIG. 4). An upper end of the extending portion 35 is positioned upward than the upper end edge of the peripheral wall 31.

A substantially rectangular recessed portion 36, which is recessed inward and opens outward and downward, is formed in an outer surface of the extending portion 35. An upper end edge portion of the recessed portion 36 extending in the longitudinal direction includes a stepped portion 37. The stepped portion 37 is engaged with the locking protrusion 18 of the first engagement portion 12 (see FIG. 4) in the state where the assembly of the body case 2 and the lower cover 3 is completed (see FIG. 1).

Next, the upper cover 4 will be described. As illustrated in FIG. 2, the upper cover 4 integrally includes a substantially rectangular cylindrical peripheral wall 41 that extends in the up-down direction, and a substantially rectangular flat plate-shaped bottom wall portion 42 that closes an upper end opening portion of the peripheral wall 41.

On an outer surface in a vicinity of a substantially rectangular frame-shaped lower end edge portion of the peripheral wall 41, fourth engagement portions 43 are respectively provided at a plurality of positions in the longitudinal direction and the width direction corresponding to the plurality of third engagement portions 24 of the body case 2. A detailed description of a structure of the fourth engagement portion 43 will be omitted. The members constituting the resin structure 1 have been described above.

Next, the assembly of the resin structure 1 including the body case 2, the lower cover 3, and the upper cover 4 will be described. When the resin structure 1 is assembled, the body case 2 and the lower cover 3 are first assembled, and then, the body case 2 and the upper cover 4 are assembled.

First, the assembly of the body case 2 and the lower cover 3 will be described. In order to assemble the body case 2 and the lower cover 3, the body case 2 and the lower cover 3 are arranged such that the body case 2 is positioned above the lower cover 3 as illustrated in FIG. 2.

Next, the body case 2 and the lower cover 3 are brought close to each other in the up-down direction to start the fitting between the lower end edge portion of the peripheral wall 11 of the body case 2 and the upper end edge portion of the peripheral wall 31 of the lower cover 3. This fitting progresses such that the lower end edge portion of the peripheral wall 11 is positioned outside the upper end edge portion of the peripheral wall 31, the extending portions 35 of the plurality of second engagement portions 33 are respectively inserted into the locking holes 15 of the plurality of first engagement portions 12, and parts of the peripheral wall 11 corresponding to the plurality of first engagement portions 12 (that is, parts of the above double wall structure) are respectively inserted into the inter-wall spaces S of the plurality of second engagement portions 33.

This fitting is continued until a lower end surface of the double wall structure positioned in the inter-wall space S (that is, the lower end surfaces of the inner wall 22 and the outer wall 23) and an upper face of the base end portion 34 of the second engagement portion 33, which defines the lower end of the inter-wall space S, abut against each other in the up-down direction.

Immediately before the lower end surfaces of the inner wall 22 and the outer wall 23 and the upper face of the base end portion 34 abut against each other, the lock arm 17 is temporarily elastically deformed outward by pressing from the extending portion 35 inserted into the locking hole 15 at each first engagement portion 12, and then, the stepped portion 37 and the locking protrusion 18 ride over the top portions of the counterparts.

As illustrated in FIG. 4, when the lower end surfaces of the inner wall 22 and the outer wall 23 and the upper face of the base end portion 34 abut against each other, the stepped portion 37 is adjacent to an upper side of the locking protrusion 18, the step portion 37 and the locking protrusion 18 are engaged with each other, and the assembly of the body case 2 and the lower cover 3 is completed.

In the state where the assembly of the body case 2 and the lower cover 3 is completed (see FIG. 1), the plurality of stepped portions 37 and the plurality of locking protrusions 18 are engaged with each other, so that the body case 2 and the lower cover 3 are prevented from being separated from each other in the up-down direction. The upper end of the extending portion 35 of the second engagement portion 33 is positioned above the upper end edge of the first engagement portion 12 (outer wall portion 14). The lower end edge portion of the peripheral wall 11 of the body case 2 and the upper end edge portion of the peripheral wall 31 of the lower cover 3 are fitted such that the lower end edge portion of the peripheral wall 11 is positioned outside the upper end edge portion of the peripheral wall 31. Therefore, even when water is poured into fitting portions between the lower end edge portion of the peripheral wall 11 of the body case 2 and the upper end edge portion of the peripheral wall 31 of the lower cover 3 from the outside of the resin structure 1, the water is prevented from entering the inside of the resin structure 1 through the fitting portions due to the action of gravity acting downward on the water. Further, at the engagement positions of the first engagement portion 12 and the second engagement portion 33, an inner side face of the extending portion 35 and an outer side face of the outer side wall 23 are in contact with each other, and the lower end surfaces of the inner wall 22 and the outer wall 23 and the upper face of the base end portion 34 are in contact with each other, so that the cavity 21 is closed. Accordingly, a creepage distance formed by the extending portion 35, the inner wall 22, and the outer wall 23 is increased as compared with that in the case where there is no double wall structure. Further, a temporary water storage (damming) effect is also exhibited by the cavity 21 between the inner wall 22 and the outer wall 23. Accordingly, even when water is poured into the engagement positions between the first engagement portion 12 and the second engagement portion 33 from the outside of the resin structure 1, the water is prevented from entering the inside of the resin structure 1 through the above engagement positions (in particular, the minute gap between the inner surface of the extending portion 35 and the outer surface of the outer wall 23). The water that has entered the cavity 21 is gradually discharged in the longitudinal direction and the width direction of the lower cover 3 from a gap between the lower end surfaces of the inner wall 22 and the outer wall 23 and the base end portion 34.

Next, the assembly of the body case 2 (to which the lower cover 3 is assembled) and the upper cover 4 will be described. In order to assemble the body case 2 (to which the lower cover 3 is assembled) and the upper cover 4, the body case 2 and the upper cover 4 are arranged such that the body case 2 (to which the lower cover 3 is assembled) is positioned below the upper cover 4, as illustrated in FIG. 2.

Next, the body case 2 and the upper cover 4 are brought close to each other in the up-down direction, the upper end edge portion of the peripheral wall 11 of the body case 2 and the lower end edge portion of the peripheral wall 41 of the upper cover 4 are fitted to each other, and the plurality of third engagement portions 24 and the plurality of fourth engagement portions 43 are respectively engaged with each other. The upper end edge portion of the peripheral wall 11 and the lower end edge portion of the peripheral wall 41 are fitted to each other such that the upper end edge portion of the peripheral wall 11 is positioned inside the lower end edge portion of the peripheral wall 41.

In a state where the assembly of the body case 2 and the upper cover 4 is completed (see FIG. 1), the plurality of third engagement portions 24 and the plurality of fourth engagement portions 43 are engaged with each other, so that the body case 2 and the upper cover 4 are prevented from being separated from each other in the up-down direction. The upper end edge portion of the peripheral wall 11 of the body case 2 and the lower end edge portion of the peripheral wall 41 of the upper cover 4 are fitted to each other such that the upper end edge portion of the peripheral wall 11 is positioned inside the lower end edge portion of the peripheral wall 41. Therefore, even when water is poured into the fitting portions between the upper end edge portion of the peripheral wall 11 of the body case 2 and the lower end edge portion of the peripheral wall 41 of the upper cover 4 from the outside of the resin structure 1, the water is prevented from entering the inside of the resin structure 1 through the fitting portions by the action of gravity acting downward on the water.

As described above, after the body case 2 and the lower cover 3 are assembled, the body case 2 and the upper cover 4 are assembled, thereby obtaining the resin structure 1 illustrated in FIG. 1. The assembly of the resin structure 1 has been described above.

Next, the inspection of the engagement state between the first engagement portion 12 of the body case 2 and the second engagement portion 33 of the lower cover 3 will be described with reference to FIG. 6 and FIGS. 7A to 7C. The inspection of the engagement state between the first engagement portion 12 and the second engagement portion 33 is performed after the body case 2 and the lower cover 3 are assembled and before the body case 2 and the upper cover 4 are assembled. A method of inspecting the engagement state between the first engagement portion 12A and the second engagement portion 33A is different from a method of inspecting the engagement state of the first engagement portion 12B and the second engagement portion 33B.

First, a method of inspecting the engagement state between the first engagement portion 12A and the second engagement portion 33A will be described. As illustrated in FIG. 6, two types of inspection tools 50, 60 are used for inspecting the engagement state between the first engagement portion 12A and the second engagement portion 33A. A contact sensor (not illustrated) is provided at a distal end portion 51 of the rod-shaped inspection tool 50. A similar contact sensor (not illustrated) may be provided on an end surface portion 61 of the inspection tool 60.

As described above, the recessed groove 19, which extends in the up-down direction from the position corresponding to the upper end portion of the first engagement portion 12A to the position corresponding to the upper end edge portion of the peripheral wall 11, is provided on an outer surface of the peripheral wall 11 above the engagement position of the first engagement portion 12A and the second engagement portion 33A. The rod-shaped inspection tool 50 has a shape by which the rod-shaped inspection tool 50 can move in the up-down direction through the recessed groove 19 in a direction in which the distal end portion 51 faces downward. In other words, the inspection tool 50 can be guided in the up-down direction by using the recessed groove 19.

As indicated by an arrow in FIG. 6, the inspection tool 50 is brought close to the engagement position of the first engagement portion 12A and the second engagement portion 33A while passing through the inside of the recessed groove 19 from the upper side to the lower side in a direction in which the distal end portion 51 faces downward. The inspection tool 50 passes through the inside of the recessed groove 19 without coming into contact with the groove bottom surface 19a in a state of being slightly separated from the groove bottom surface 19a of the recessed groove 19. When the contact sensor of the inspection tool 50 comes into contact with an upper end surface of the extending portion 35 of the second engagement portion 33, which is positioned above the upper end edge of the first engagement portion 12 (outer wall portion 14), the contact sensor outputs a contact signal. Based on this contact signal, it is inspected whether the vertical position of the upper end surface of the extending portion 35 of the second engagement portion 33 is within an appropriate range. For example, when the engagement between the first engagement portion 12A and the second engagement portion 33A is incomplete, the vertical position of the upper end surface of the extending portion 35 of the second engagement portion 33 deviates downward from the appropriate range.

Here, as can be understood from FIG. 6, a sufficient gap in the inner-outer direction is ensured between the upper end portion of the extending portion 35 of the second engagement portion 33 and the groove bottom surface 19a of the recessed groove 19. Therefore, the end surface of the distal end portion 51 (contact sensor) of the inspection tool 50 can be ensured sufficiently wide in the inner-outer direction. As a result, the upper end surface of the extending portion 35 of the second engagement portion 33 and an end surface of the distal end portion 51 (contact sensor) of the inspection tool 50 are easily brought into appropriate contact with each other, and the inspection accuracy based on the inspection tool 50 is improved.

As illustrated in FIG. 6, the inspection tool 60 extends from the outside toward the inside in a direction in which an end surface portion 61 faces the inside. The resin structure 1 may be moved such that the outer wall portion 14 of the first engagement portion 12A approaches the inspection tool 60 arranged as illustrated in FIG. 6, or the inspection tool 60 may approach the outer wall portion 14 (lock arm 17) of the first engagement portion 12A in the same manner as the inspection tool 50. For example, in a case where a contact sensor similar to that of the inspection tool 50 is provided in the inspection tool 60, the contact sensor outputs a contact signal when the contact sensor of the inspection tool 60 comes into contact with the outer surface of the outer wall portion 14 (lock arm 17). Based on this contact signal, it is inspected whether the position of the outer surface of the outer wall portion 14 (lock arm 17) of the first engagement portion 12 in the inner-outer direction is within an appropriate range. For example, when the engagement between the first engagement portion 12A and the second engagement portion 33A is incomplete, the outer wall portion 14 (lock arm 17) is elastically deformed outward since the stepped portion 37 and the locking protrusion 18 do not ride over the top portions of the counterparts. Therefore, the position of the outer surface of the outer wall portion 14 (lock arm 17) in the inner-outer direction deviates from the appropriate range.

In the inspection of the engagement state between the first engagement portion 12A and the second engagement portion 33A, the state of "normal" is determined only when the vertical position of the upper end of the extending portion 35 of the second engagement portion 33 detected by the inspection tool 50 is within the appropriate range and the position of the outer surface of the outer wall portion 14 (lock arm 17) in the inner-outer direction detected by the inspection tool 60 is within the appropriate range. In this way, the inspection performed by the inspection tool 60 in addition to the inspection performed by the inspection tool 50, the inspection accuracy of the engagement state between the first engagement portion 12A and the second engagement portion 33A is improved.

Next, a method of inspecting the engagement state between the first engagement portion 12B and the second engagement portion 33B will be described. As described above, a recessed groove extending to a position corresponding to the upper end edge portion of the peripheral wall 11, such as the recessed groove 19, is not formed on the outer surface of the peripheral wall 11 above the engagement position between the first engagement portion 12B and the second engagement portion 33B. Therefore, the inspection using the inspection tool 50 described above cannot be performed. Therefore, in the inspection of the engagement state between the first engagement portion 12B and the second engagement portion 33B, it is inspected whether the position of the outer surface of the outer wall portion 14 (lock arm 17) in the inner-outer direction is within the appropriate range by the same procedure as described above using only the inspection tool 60. The inspection of whether the vertical position of the upper end of the extending portion 35 of the second engagement portion 33 is within an appropriate range is performed by visual observation of an operator.

In the inspection of the engagement state between the first engagement portion 12B and the second engagement portion 33B, the state of "normal" is determined only when the vertical position of the upper end of the extending portion 35 of the second engagement portion 33 detected by visual observation of the operator is within the appropriate range and the position of the outer surface of the outer wall portion 14 (lock arm 17) in the inner-outer direction detected by the inspection tool 60 is within the appropriate range.

Figure 7A:
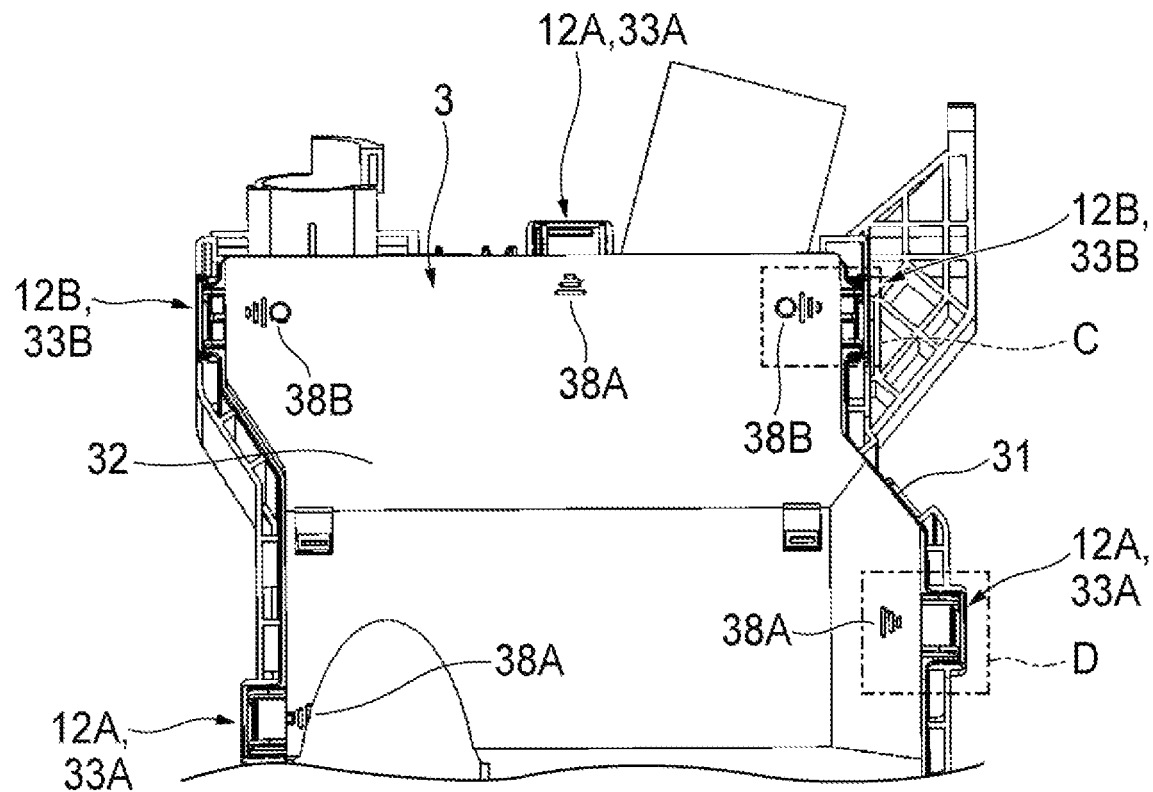
FIG. 7A is a bottom view of the resin structure illustrated in FIG. 1.
Figure 7B:
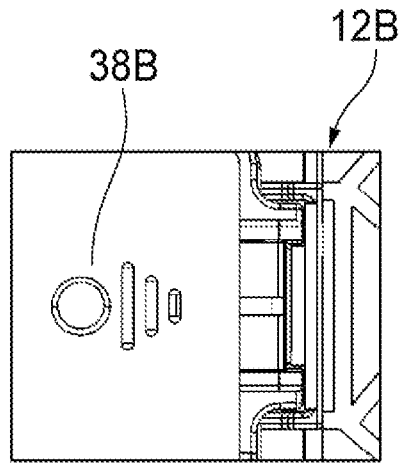
FIG. 7B is an enlarged view of a portion C in FIG. 7A.
Figure 7C:
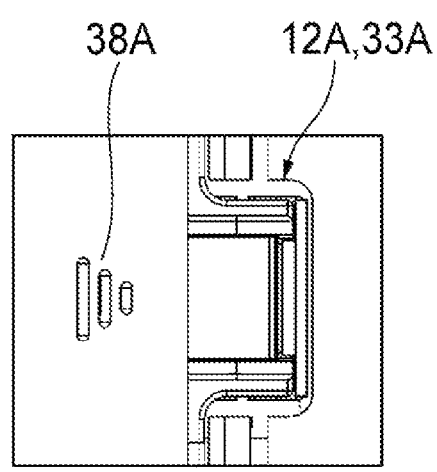
FIG. 7C is an enlarged view of a portion D in FIG. 7A.

As described above, the method of inspecting the engagement state between the first engagement portion 12A and the second engagement portion 33A is different from the method of inspecting the engagement state between the first engagement portion 12B and the second engagement portion 33B. Therefore, in this example, a first sign (mark) 38A, which means that the inspection with the inspection tool 50 and the inspection tool 60 is performed, is attached to a lower surface (bottom wall portion 32) of the lower cover 3 in the vicinity of each second engagement portion 33A, and a second sign (mark) 38B, which means that the inspection with the visual observation and the inspection tool 60 is performed, is attached to a lower surface (bottom wall portion 32) of the lower cover 3 in the vicinity of each second engagement portion 33B, as illustrated in FIGS. 7A, 7B, and 7C. The first sign 38A and the second sign 38B have different external appearances. Accordingly, the operator can easily determine what kind of inspection should be performed by simply looking at the sign (either the first sign portion 38A or the second sign portion 38B) positioned in the vicinity of each second engagement portion 33.

Operation and Effect

As described above, according to the resin structure 1 of the present embodiment, the recessed groove 19 provided in the peripheral wall 11 of the body case 2 extends from the first engagement portion 12 (that is, the assumed engagement position between the first engagement portion 12 and the second engagement portion 33 of the lower cover 3) of the body case 2 to a boundary between the body case 2 and the upper cover 4. Therefore, for example, after the body case 2 and the lower cover 3 are assembled and before the upper cover 4 is further assembled to the body case 2, the inspection tool 50 can be brought close to the first engagement portion 12 to pass through the inside of the recessed groove 19. In other words, the inspection tool 50 can be guided toward the first engagement portion 12 by using the recessed groove 19. Further, the groove bottom surface 19a of the recessed groove 19 and the second engagement portion 33 (in particular, the extending portion 35) engaged with the first engagement portion 12 are disposed at positions spaced apart from each other in the thickness direction of the peripheral wall 11 by the protruding portion (the outer wall 23) provided on the peripheral wall 11. Therefore, even when the second engagement portion 33 is small and thin, the exposure amount of the second engagement portion 33 with respect to the recessed groove 19 can be easily increased, and thus the inspection tool 50 can be easily brought close to the second engagement portion 33. Further, the contact surface of the inspection tool 50 can be widened. Therefore, the occurrence rate of erroneous detection in the assembly inspection using the inspection tool 50 is reduced, and the inspection accuracy is improved. Therefore, the resin structure 1 according to the present embodiment has a structure by which the assembled state of the plurality of resin bodies (the body case 2 and the lower cover 3) can be inspected with high accuracy.

According to the resin structure 1 of the present embodiment, even when water is poured into the engagement position between the first engagement portion 12 of the body case 2 and the second engagement portion 33 of the lower cover 3, the peripheral wall 11 of the body case 2 has a double wall structure at the engagement position, and the second engagement portion 33 faces the lower surface of a wall body (the inner wall 22 and the outer wall 23) constituting the double wall structure and closes the cavity 21, so that the water is prevented from entering the inside of the resin structure 1 through the boundary between the body case 2 and the lower cover 3. As compared with the case where the peripheral wall 11 of the body case 2 does not have the recessed groove 19, it is easy to provide a double wall structure in the peripheral wall 11 since there is a design margin in the thickness direction of the peripheral wall 11 by the depth of the recessed groove 19. Therefore, the resin structure 1 according to the present embodiment can improve the waterproof performance at the engagement position between the first engagement portion 12 and the second engagement portion 33.

Furthermore, according to the resin structure 1 of the present embodiment, the sign portions 38A, 38B having an external appearance corresponding to the types of the second engagement portions 33 (33A, 33B) are disposed in the vicinity of the corresponding second engagement portions 33. Therefore, although the execution method of the inspection is different for each type of the second engagement portion 33 (33A, 33B), it is possible to easily determine what inspection should be executed only by looking at the sign portions 38A, 38B. As a result, the productivity of the resin structure 1 can be improved.

Other Embodiments

The present disclosure is not limited to the above-described embodiment, and various modifications can be used within the scope of the present disclosure. For example, the present disclosure is not limited to the above-described embodiment, and may be appropriately modified, improved or the like. Additionally, materials, shapes, sizes, numbers, arrangement positions, or the like of each element in the above-described embodiment are optional and are not limited as long as the present disclosure can be exerted.

In the above embodiment, a part of the peripheral wall 11 of the body case 2 corresponding to the first engagement portion 12 (that is, a part defining the inner end of the locking hole 15) has a double-wall structure in which the cavity 21 opening downward is sandwiched between the inner wall 22 and the outer wall 23, as illustrated in FIGS. 4 and 6. In contrast, such a double wall structure may not be provided.

Further, in the above embodiment, the inspection tool 50 passes through the inside of the recessed groove 19 in a state of being slightly separated from the groove bottom surface 19a of the recessed groove 19, as illustrated in FIG. 6. That is, in the process of the above-described inspection, the inspection tool 50 does not come into contact with the groove bottom surface 19a of the recessed groove 19. In this case, the inspection tool 50 may move in the recessed groove 19 while coming into contact with the groove bottom surface 19a (for example, while sliding along the groove bottom surface 19a), or may move in the recessed groove 19 such that the inspection tool 50 comes into contact with the groove bottom surface 19a at a part of the recessed groove 19 and does not come into contact with the groove bottom surface 19a at the other part of the recessed groove 19.

In the above embodiment, as illustrated in FIGS. 7A, 7B, and 7C, the first sign (mark) 38A is attached to the lower surface of the lower cover 3 in the vicinity of each second engagement portion 33A, and the second sign (mark) 38B is attached to the lower surface of the lower cover 3 in the vicinity of each second engagement portion 33B. On the other hand, a single type of signs (marks) may be attached to the lower surface of the lower cover 3 in the vicinity of each of all the second engagement portions 33 without distinguishing between the second engagement portion 33A and the second engagement portion 33B.

According to an illustrative aspect of the present disclosure, a resin structure (1) includes: a first resin body (2); a second resin body (3) configured to be assembled to the first resin body (2); and a third resin body (4) configured to be assembled to the first resin body (2). The first resin body (2) includes: a first engagement portion (12) provided in a wall portion (11) of the first resin body (2) in a vicinity of a boundary between the first resin body (2) and the second resin body (3); and a recessed groove (19) provided in the wall portion (11) to extend from the first engagement portion (12) toward a boundary between the first resin body (2) and the third resin body (4). The second resin body (3) includes a second engagement portion (33) that engages with the first engagement portion (12). The recessed groove (19) is configured to guide an inspection tool (50) toward the first engagement portion (12) along the recessed groove (19) in a state where the second resin body (3) is assembled to the first resin body (2) and the third resin body (4) is not assembled to the first resin body (2), the inspection tool (50) being a tool for inspecting an engagement state between the first engagement portion (12) and the second engagement portion (33). The wall portion (11) includes a protruding portion (23) protruding in a thickness direction of the wall portion (11) toward the second engagement portion (33), at a position where the first engagement portion (12) is provided. A groove bottom surface (19a) of the recessed groove (19) and the second engagement portion (33) engaged with the first engagement portion (12) are spaced apart from each other in the thickness direction by the protruding portion (23).

According to the above configuration of the resin structure, the recessed groove provided in the wall portion of the first resin body extends from the first engagement portion (that is, an assumed engagement position) of the first resin body toward a boundary between the first resin body and the third resin body. Therefore, for example, after the second resin body is assembled to the first resin body and before the third resin body is further assembled to the first resin body, the inspection tool can be brought close to the first engagement portion while passing through the inside of the recessed groove. Further, the groove bottom surface of the recessed groove and the second engagement portion engaged with the first engagement portion are disposed at positions spaced apart from each other in the thickness direction of the wall portion by the protruding portion provided on the wall portion. Therefore, even when these engagement portions are small and thin, the exposure amount of these engagement portions with respect to the recessed groove can be easily increased, and thus the inspection tool can be easily brought close to the engagement positions of these engagement portions. Further, the contact surface of the inspection tool can be widened. Therefore, the occurrence rate of erroneous detection in the assembly inspection using the inspection tool is reduced, and the inspection accuracy is improved. The protruding portion of the wall portion also contributes to improvement of waterproof performance as described later. As described above, the resin structure having the present configuration includes a structure by which the assembled state of the plurality of resin bodies can be inspected with high accuracy.

According to the above aspect of the present disclosure, the wall portion (11) of the first resin body (2) may include a double wall structure in which a pair of wall bodies (22, 23) interpose a cavity (21) opening toward the second resin body (3), at a position where the protruding portion (23) is provided. The second engagement portion (33) of the second resin body (3) may include an engagement wall (34) configured to face at least one of the pair of wall bodies (22, 23) and close the cavity (21) when the second engagement portion (33) is engaged with the first engagement portion (12).

According to the above configuration of the resin structure, the wall portion of the first resin body includes a double wall structure at the above-described protruding portion (that is, the engagement position of the engagement portions), and the second engagement portion faces the wall body constituting the double wall structure and closes the cavity between the wall bodies. Accordingly, the creepage distance of the engagement position between the first engagement portion and the second engagement portion is increased, and a so-called labyrinth waterproof structure is obtained. Therefore, even when water is poured into the engagement position, the water is prevented from entering the inside of the resin structure through the gap between the first resin body and the second resin body. Further, by using the protruding portion described above, there is a margin in design in the thickness direction of the wall portion as compared with the case where there is no protruding portion, and thus it is possible to easily provide a double wall structure excellent in thickness, width of a cavity. Therefore, the resin structure having the present configuration can improve the waterproof performance at the engagement position between the first engagement portion and the second engagement portion.

According to the above aspect of the present disclosure, the second engagement portion (33) may include a plurality of types of the second engagement portions (33A, 33B) having structures different from each other. The second resin body (3) may further include: the plurality of types of the second engagement portions (33A, 33B); and a plurality of types of sign portions (38A, 38B) having different appearances corresponding to each type of the second engagement portions (33A, 33B). The plurality of types of sign portions (38A, 38B) may be each disposed in a vicinity of the corresponding second engagement portions (33A, 33B).

According to the above configuration of the resin structure, the sign portion having an external appearance corresponding to the types of the second engagement portion is disposed in the vicinity of the corresponding second engagement portion. Therefore, for example, in a case where the above-described inspection execution method is different for each type of the second engagement portion (for example, in a case where an inspection using an inspection pin is performed for a certain type of second engagement portion and an inspection is performed only by visual observation for another type of the second engagement portion), it is possible to easily determine what inspection is to be executed only by checking the external appearance of the sign portion. As a result, the productivity of the resin structure can be further improved.

As described above, according to the present disclosure, it is possible to provide a resin structure having a structure by which an assembled state of a plurality of resin bodies can be inspected with high accuracy.

What is claimed is:

1. A resin structure comprising:
a first resin body;
a second resin body configured to be assembled to the first resin body; and
a third resin body configured to be assembled to the first resin body,
wherein the first resin body includes:
a first engagement portion provided in a wall portion of the first resin body in a vicinity of a boundary between the first resin body and the second resin body; and
a recessed groove provided in the wall portion to extend from the first engagement portion toward a boundary between the first resin body and the third resin body,
the second resin body includes a second engagement portion that engages with the first engagement portion,
the recessed groove is configured to guide an inspection tool toward the first engagement portion along the recessed groove in a state where the second resin body is assembled to the first resin body and the third resin body is not assembled to the first resin body, the inspection tool being a tool for inspecting an engagement state between the first engagement portion and the second engagement portion,
the wall portion includes a protruding portion protruding in a thickness direction of the wall portion toward the second engagement portion, at a position where the first engagement portion is provided, and
a groove bottom surface of the recessed groove and the second engagement portion engaged with the first engagement portion are spaced apart from each other in the thickness direction by the protruding portion.

2. The resin structure according to claim 1,
wherein the wall portion of the first resin body includes a double wall structure in which a pair of wall bodies interpose a cavity opening toward the second resin body, at a position where the protruding portion is provided, and
the second engagement portion of the second resin body includes an engagement wall configured to face at least one of the pair of wall bodies and close the cavity when the second engagement portion is engaged with the first engagement portion.

3. The resin structure according to claim 1,
wherein the second engagement portion includes a plurality of types of the second engagement portions having structures different from each other, the second resin body further includes:
   the plurality of types of the second engagement portions; and
   a plurality of types of sign portions having different appearances corresponding to each type of the second engagement portions, and the plurality of types of sign portions are each disposed in a vicinity of the corresponding second engagement portions.

4. The resin structure according to claim 1, wherein
the second resin body is assembled to a lower portion of the first resin body; and
a third resin body is assembled to an upper portion of the first resin body.

* * * * *